United States Patent [19]
Baker

[11] Patent Number: 6,076,083
[45] Date of Patent: Jun. 13, 2000

[54] DIAGNOSTIC SYSTEM UTILIZING A BAYESIAN NETWORK MODEL HAVING LINK WEIGHTS UPDATED EXPERIMENTALLY

[76] Inventor: Michelle Baker, 325 Riverside Dr., Apt. #123, New York, N.Y. 10025

[21] Appl. No.: 08/708,098

[22] Filed: Aug. 21, 1996

Related U.S. Application Data

[60] Provisional application No. 60/002,591, Aug. 21, 1995.

[51] Int. Cl.[7] ................................................... G06N 5/02
[52] U.S. Cl. ............................. 706/52; 706/45; 706/46; 706/61
[58] Field of Search ................................ 395/61, 51, 60; 706/45, 46, 50, 52, 59–61, 12, 14

[56] References Cited

U.S. PATENT DOCUMENTS

| | | | |
|---|---|---|---|
| 5,005,143 | 4/1991 | Altschuler et al. | 702/181 |
| 5,493,729 | 2/1996 | Nigawara et al. | 706/52 |

OTHER PUBLICATIONS

R. G. Cowell et al., "Bayesian Networks for the Analysis of Drug Safety," The Statistician, vol. 42, No. 4, pp. 369–384, 1993.

Spiegelhalter, D.J. "Coping with uncertainty," IEE Colloquium on Computer Based Diagnosis, pp. May 1–May 2, 1988.

Myllymaki, P. et al. "Learning in neural networks with Bayesian prototypes," Conference Record or Southcon/94, pp. 60–64, Mar. 1994.

Bellazzi, R. et al. "GAMEES II: an environment for building probabilistic expert systems based on arrays of Bayesian belief networks," Proceedings of Fifth Annual IEEE Symposium on Computer–Based Medical Systems, pp. 546–553, Jun. 1992.

Cowell, R.G. et al. "Sequential model criticism in probabilistic expert systems," IEEE Transactions on Pattern Analysis and Machine Intelligence, vol. 15, No. 3, pp. 209–219, Mar. 1993.

R.G. Cowell et al. "Sequential model criticism in probabilistic expert systems," IEEE Transactions on Pattern Analysis and Machine Intelligence, vol. 15, No. 3, pp. 209–219, Mar. 1993.

D. Heckerman et al., "A Bayesian Approach to Learning Causal Networks," Technical Report MSR–TR–95–04, Microsoft Research Advanced Technology Division, p. 1–22, Mar. 1995 (Revised May 1995).

D. Heckerman, "Bayesian Networks for Knowledge Discovery" in Advances in Knowledge Discovery and Data Mining, Eds. U. Fayyad et al., Menlo Park, CA, AAAI Press, Mar. 1996.

(List continued on next page.)

*Primary Examiner*—Eric W. Stamber
*Assistant Examiner*—Jason W. Rhodes
*Attorney, Agent, or Firm*—David P. Gordon; David S. Jacobson; Thomas A. Gallagher

[57] ABSTRACT

Diagnostic systems utilizing a bayesian network model having link weights updated experientially include an algorithm for easily quantifying the strength of links in a Bayesian network, a method for reducing the amount of data needed to automatically update the probability matrices of the network on the basis of experiential knowledge, and methods and algorithms for automatically collecting knowledge from experience and automatically updating the Bayesian network with the collected knowledge. A practical exemplary embodiment provides a trouble ticket fault management system for a communications network. The exemplary embodiment is particularly appropriate for utilizing the automatic learning capabilities of the invention. In the exemplary embodiment, a communications network is represented as a Bayesian network where devices and communication links are represented as nodes in the Bayesian network. Faults in the communications network are identified and recorded in the form of a trouble ticket and one or more probable causes of the fault are given based on the Bayesian network calculations. When a fault is corrected, the trouble ticket is updated with the knowledge learned from correcting the fault. The updated trouble ticket information is used to automatically update the appropriate probability matrices in the Bayesian network.

20 Claims, 3 Drawing Sheets

OTHER PUBLICATIONS

D. Heckerman et al., "Learning Bayesian Networks: The Combination of Knowledge and Statistical Data," Technical Report MSR–TR–94–09, Microsoft Research Advanced Technology Division, pp. 1–53, Mar. 1994 (Revised Feb. 1995).

H. Kirsch et al., "Applying Bayesian Networks to Fault Diagnosis," Proceedings of the Third IEEE Conference on Control Applications, vol. 2, p. 895–900, Aug. 1994.

Cassuto, Phillipe. "Bayesian Networks" Projects in Network Management CSE–6901, Columbia University School of Engineering and Applied Sciences, 1991.

Breese et al. "Decision–Theoretic Case–Based Reasoning" Technical Report MSR–TR–95–03, Microsoft Research Advanced Technology Division, Nov. 1994.

| D | A B | A $\overline{B}$ | $\overline{A}$ B | $\overline{A}$ $\overline{B}$ |
|---|-----|-----|-----|-----|
| T | .89 | .85 | .89 | .30 |
| F | .11 | .15 | .11 | .70 |

DIAGNOSTIC SYSTEM UTILIZING A BAYESIAN NETWORK MODEL HAVING LINK WEIGHTS UPDATED EXPERIMENTALLY

This application claims the benefit of provisional application Ser. No. 60/002,591 filed Aug. 21, 1995, a copy of which is attached hereto as Appendix A.

BACKGROUND OF THE INVENTION

1. Field of the Invention

The invention relates to a diagnostic system utilizing a Bayesian network model. More particularly, the invention relates to an expert system utilizing a Bayesian network model wherein the link weights of the model are automatically updated based on experiential diagnostic successes.

2. State of the Art

Diagnostic systems, otherwise known as "expert systems" attempt to determine a cause as producing of two or more contemporaneous events. In medical terminology, a diagnostic/expert system attempts to determine the identity of a disease as producing of two or more contemporaneous symptoms. Computer based diagnostic/expert systems are commonplace today and are applied to diagnosing problems in many different areas. For example, such systems are utilized to diagnose diseases, to locate geological formations, and to manage complex apparatus such as nuclear power plants, communications networks, etc.

All expert systems are built around a "knowledge base" of domain specific information and an "inference engine". When an expert system is presented with a problem to solve, the "inference engine" combines information in the knowledge base with information about the problem. The "inference engine" applies its particular type of reasoning methodology to derive conclusions on the basis of the information it has available to it. Diagnostic expert systems provide a diagnosis on the basis of two or more contemporaneous symptoms. (A diagnosis based on a single symptom is either too speculative to be of value or too simple to require an expert system). Expert systems differ according to the organization and type of information stored in the knowledge base and according to the reasoning methodology employed by the "inference engine".

The earliest type of expert system is called a "rule-based" system. In this type of system the knowledge base is made up of a set of condition/action rules in the form "if . . . then". A problem is presented to the system in the form of a set of propositions stated to be known to be true. The inference engine uses Aristotelian logic to deduce non-obvious propositions from the application of rules to conditions input as the problem statement. Rule based reasoning may proceed in two modes: forward chaining or backward chaining. In forward chaining, the conclusions reached from applying rules are added to the set of conditions which are scanned to apply further rules. In backward chaining, the system is presented with a hypothesis for confirmation or denial. The system searches for rules which could satisfy the hypothesis and scans current conditions to determine whether the rule can be applied. If there are no conditions which would support the application of the rule needed, the system scans for other rules which could support the rule needed and then scans for conditions to support the other rule. Both forward and backward chaining are recursively executed until all of the conditions and rules have been examined. Rule based systems become unmanageable as the number of rules and conditions grows large.

An alternative to a rule based system is a "case based system". In a case based system, knowledge is organized according to problems which have been successfully solved. When presented with a problem, the case based system searches for similar problems which have been successfully solved. Case based systems work best when the problems in the knowledge base are organized according to type. However, case based systems are inefficient because they may contain more cases than necessary to solve the problems presented to the system. In addition, maintaining a case based system is labor intensive as new cases must be carefully described and categorized as they are entered into the system. Further, new knowledge may invalidate existing cases in the knowledge base, leading to inconsistencies. Finally, unless a problem matches a case in the database exactly, an algorithm must be used to determine which "imperfect match" is most similar to the given problem. These algorithms are generally ad hoc and designed or tuned by system developers to work on particular problems or in particular domains. There are no general rules on how to evaluate inexact matches and therefore it is difficult to estimate the reliability or problem solving performance of these systems.

It will be appreciated that each of the systems described above relies on a binary logic wherein decisions are made on the assumption of certainty. In other words, in the rule based system, a rule either applies or it doesn't. In a case based system, a case is found or it isn't. This approach works in cases where knowledge of the system has an absolute, syllogistic character. However, for systems about which knowledge is uncertain and for which one must reason in terms of levels of confidence, this approach is inadequate.

Recently, there have been many advances in the use of probabilistic expert systems. These systems make decisions based on probabilities rather than on the basis of binary logic. In one of the earliest applications of probabilities in expert systems, a probability value was attached to each rule in a rule-based expert system. Probabilities were propagated across chains of inference by multiplying probabilities of successive rules in a chain. This method did not work well because it relied on the assumption that antecedent conditions of all the rules of a rule chain are probabilistically independent. This assumption conflicted with a basic rationale of rule-based systems, i.e., the ability to specify each rule as a separate entity, without regard to interactions among rules. In general it was found to be impossible to add probabilities to rule-based systems in a theoretically sound manner without considering interactions among the rules in all possible rule chaining.

An alternative approach which emphasizes theoretically sound and consistent use of probabilities builds the expert system around a knowledge base that is a representation of a probability distribution. In these systems, the inference engine uses a reasoning methodology that computes conditional probability distributions over the underlying joint probability distribution represented in the knowledge base. Conclusions are formulated as probability distributions over the propositions of interest. For example, a probabilistic medical diagnostic system might represent possible diseases with a single DISEASE variable that takes on values that range over a set of diseases:

DISEASE={babesiosis, rheumatoid arthritis, lyme disease}.

A problem is presented to the system as a set of values for one or more symptom variables: RASH=false, JOINT_PAIN=true . . . TEMPERATURE=101.8. The inference engine reasons by computing a conditional probability distribution for one or more variables that may not be directly observable—normally the unobservable causes of the input symptoms: P(DISEASE| RASH=false, JOINT—PAIN=true . . . TEMPERATURE=101.8)=(0.1, 0.6, 0.3) thereby assigning the probabilities of taking on diseases defined in the system as babesiosis=0.1, rheumatoid arthritis=0.6, and lyme disease=0.3

The form of problem solving described above is well understood in the field of mathematics and is generally known as "classification". It is also well known that the computation of conditional probability distribution of a class given the features of an instance of an unknown class is an optimal algorithm in the sense that the likelihood of making an erroneous classification is minimized. However, the practical application of this inference methodology has been limited for two reasons. First, it requires that a full joint probability distribution be known and stored in a form that can be manipulated. Second, it has been necessary to perform computations that sum probabilities over nearly all of the points in the full joint probability distribution.

It will be appreciated that in the case of discrete variables, a full joint distribution of probabilities based on N evidential variables will have $O(2^N)$ values. [O(x) is notation for "on the order of x".] A common strategy to reduce the complexity of handling a full joint probability distribution is to assume that all pairs of variables in the distribution are marginally independent. This assumption allows one to specify and store only one marginal probability distribution for each variable in the domain. Moreover, every point in the full distribution can be derived by multiplying marginal distributions for individual variables. This assumption reduces the size of the storage and computation requirements for a distribution to O(N).

U.S. Pat. No. 5,133,046 to Kaplan describes a diagnostic expert system which implements optimal classification algorithm described above by assuming marginal independence between all pairs of variables. The Kaplan system includes a diagnostic module which generates a diagnosis in the form of probability distributions. A state domain is created to define various states of the system to be diagnosed and Bayes theorem is used to quantify the probabilities that certain symptoms are indicative of a particular state. While the Kaplan system is an advance over binary logic expert systems, it does have several shortcomings. First, all of the symptoms indicative of different states in the state domain are assumed to be marginally independent. This reduces the number of calculations needed to define the state domain and also reduces the amount of storage space required for the state domain. However, with few exceptions, it represents a relatively poor approximation of the true probability distribution of the domain. The algorithm will not minimize the likelihood of an erroneous diagnosis if the underlying probability model is inaccurate. Further, the Kaplan system is static in that once the domain is defined, probabilities are not updatable to reflect new knowledge about the system.

As mentioned above, Kaplan uses Bayes theorem to quantify probabilities. Bayesian analysis takes into account conditional probabilities and provides a rule for quantifying confidence (beliefs or probability) based on evidence. Bayes theorem, known as the inversion formula, is listed below as equation (1).

$$P(H \mid e) = \frac{P(e \mid H) P(H)}{P(e)} \quad (1)$$

Equation (1) states that the probability of (or belief in) hypothesis H upon obtaining evidence e is equal to the probability (or degree of confidence) that evidence e would be observed if H is true, multiplied by the probability of H prior to learning evidence e (the previous belief that H is true), divided by the probability of evidence e. P(H|e) is referred to as the posterior probability. P(H) is referred to as the prior probability. P(e|H) is referred to as the likelihood; and P(e) is a normalizing constant. Bayesian analysis is particularly useful in an expert system because the likelihood can often be determined from experimental knowledge and the likelihood can be used to determine the otherwise difficult to determine posterior probability.

As alluded to above, the inversion formula can be used to quantify confidence based on multiple pieces of evidence. For example, with N pieces of evidence, the inversion formula would take the form shown in equation (2).

$$P(H \mid e_1, e_2, \ldots, e_N) = \frac{P(e_1, e_2, \ldots, e_N \mid H) P(H)}{P(e_1, e_2, \ldots, e_N)} \quad (2)$$

It will be appreciated that a full joint distribution of probabilities based on N pieces of evidence will have $2^N$ values. If, however, it is known that each piece of evidence is independent of the others (marginal independence), the inversion formula can be reduced to the form shown in equation (3) and the distribution can be reduced in size to N number of values.

$$P(H \mid e_1, e_2, \ldots, e_N) = \frac{P(H) \prod_i P(e_i \mid H)}{\prod_i P(e_i)} \quad (3)$$

Bayesian networks are a more recent representational and computational innovation for reducing the complexity of a discrete joint probability distribution by taking advantage of much less restrictive assumptions of conditional independence among sets of variables. Developed in the late 1980s, the concept of a Bayesian network uses a model of dependent knowledge in the form of a graph. The graph is referred to as a directed acyclic graph (DAG) in which each node represents a random variable and each link represents probabilistic dependence among the linked variables. To reduce the difficulty of modeling, knowledge of causal relationships among variables is used to determine the position and direction of the links. The strength (or weight) of the influences are quantified by conditional probabilities. Prior art FIG. 1 is an example of a Bayesian network DAG and prior art FIG. 1a is a probability matrix indicating the strength of the influences of nodes A and B on node C.

Referring now to FIG. 1, the example Bayesian network has seven nodes, A through G. Each node is connected to at least one other node by a link which is designated as an arrow, the direction of which indicates probabilistic dependence. Thus, node D is dependent upon nodes A and B. Node F is dependent on nodes B and C. Conditional independence among variables in the distribution allow for reduced storage and computational requirements. In FIG. 1a node G is independent of node A given the value of node D. Conditional independence is also represented using siblings in the graph. For example, nodes D and F are independent given the value of node B. Nodes at the tail end of a link are referred to as parents and parents which are not influenced by any other nodes are called root nodes. Each node in the graph represents a variable in the probability distribution. For each root node, the associated variable's marginal distribution is stored. For each non-root node, a probability matrix is created which indicates the conditional probability distribution of that node given the values of its parent nodes.

For example, as shown in FIG. 1a, the value of the variable at node D is related probabilistically to the value of the variables at nodes A and B. FIG. 1a illustrates that the value of the variables at nodes A, B, and D is a binary value, but a range of values could be used with appropriate functions. As shown, the variable at node D takes the value T with a probability of 0.89 when the variables at nodes A and B are T. When the variable at node A is T but the variable at node B is F, the probability that the value of the variable at node D is T drops to 0.85. When both the variables at nodes A and B are F, the probability that the value of the variable at node D is T drops to 0.30. It will be appreciated that for any given state of the parent nodes, the probabilities of the values of the influenced node always sums to one.

In other words, the "knowledge base" of an expert system based on a Bayesian network consists of (1) a DAG including a node for each of the variables in the domain as described above and (2) either a marginal or a conditional probability distribution stored at each node. The "inference engine" of a Bayesian Network expert system uses well known algorithms to compute conditional probabilities for each variable whose value has not been directly observed. As with other expert systems described above, the Bayesian network functions when presented with a problem description that consists of a set of attribute values. Each variable whose value is included in the problem description is instantiated with that value. A problem description need not be known with certainty. Instead attribute/value pairs may themselves be uncertain values with probabilities attached. The impact of observed variable values on the network is viewed as a perturbation which propagates through the network from node to node as the algorithms are run. The algorithms can be distributed across different processors by propagating information in the usual manner across communications media that links the different processors.

At least one software package is available for designing and operating a Bayesian network. The software is known as "HUGIN" which references the Scandinavian myth of a raven god of Odin that brought him news from the whole world, the term later regarded as personifying thought. HUGIN is produced and marketed by Hugin Expert A/S, Niels Jernes Vej 10, Box 8201 DK-9220, Aalborg, Denmark. The HUGIN software includes an editor which is used to specify nodes and possible states of the nodes in a Bayesian network as well as the links between nodes and the conditional probability matrices at each node. The HUGIN software also includes an inference engine and an application program interface which is a library of C-language functions. The HUGIN software supports both marginally and conditionally independent variables, although it is up to the designer to provide the proper specifications for each. For example, the expert system described in Kaplan can be represented as a special case of a Bayesian network in which there is one root node that takes on different values for different faults and the one root is linked to all the children representing different symptoms. Because Kaplan assumes that all children are pairwise independent there would be no links between the children nodes and no more than one parent for each child node in the Bayesian network model. The inference algorithms included in HUGIN would perform the equivalent table lookup and probabilistic computations as described by Kaplan. In addition, the HUGIN software operates the Bayesian network by propagating observed variable values. The HUGIN software does not, however, provide any means for adjusting the conditional probability matrices after the Bayesian network has been designed.

The foregoing discussion mainly concerns the problems related to the computational complexity of inference and storage of joint probability distributions over discrete variables. An even more difficult problem associated with inference over a discrete probability model of a domain is the need for specifying the probability for each of the points in the distribution. In prior art expert systems such as those described by Kaplan or those built using HUGIN, these probabilities are estimated and entered manually by a domain expert. One of the strengths of rule-based expert systems is that the form of the knowledge base abstracts from most of the detail in the domain and closely matches the way that experts think about problems. This is not true for the specification of points in a joint probability distribution. While experts may have good estimates for marginal probabilities it is normally very difficult to estimate point probabilities. This is particularly true for probabilities associated with causal variables that cannot be directly observed and as such are the focus of interest in expert systems.

Bayes inversion formula is a well known method for deriving difficult to observe conditional probabilities from probabilities that are easier to estimate using experimental data and statistical inference. It indicates that evidence from solved problems can be used to estimate the distribution of the domain. However, the inversion formula cannot be applied directly to estimate the probabilities in the knowledge base of a Bayesian network expert system.

U.S. Pat. No. 5,528,516 to Yemini et al. discloses an expert system for managing a communications network which on its face appears to implement a Bayesian network approach. The Yemeni et al. disclosure appears to be derived in part from a confidential unpublished work of the present inventor which forms the basis of the provisional application contained in Appendix A. The Yemeni et al. system fails, however, to fully implement a true Bayesian network for several reasons. First, it assumes a 1:1 correspondence between a set of evidence and a problem. Second, it does not associate a probabilistic value to the relationship between a piece of evidence and a problem. Third, it does not fully address the issue of conditional independence or full independence. While the Yemini et al. disclosure alludes to solutions to these three issues, no real solutions are provided and the disclosed embodiment virtually precludes resolution of these issues. Consequently, Yemini et al. does not teach any method for adjusting the probability distributions at nodes of a Bayesian network.

From the foregoing, it will be appreciated that tools exist for defining a static Bayesian network knowledge base and for carrying out inference by propagating the observed evidence through the network. However, there is no easy way of specifying the probabilities that make up the conditional distributions in a Bayesian network knowledge base. Moreover, it is not possible to automatically update the probabilities specified in the knowledge base as additional evidence is gathered. Thus, there are no Bayesian network expert systems which learn from experience and adjust link weights to more accurately reflect the body of available knowledge.

SUMMARY OF THE INVENTION

It is therefore an object of the invention to provide a probabilistic expert/diagnostic system which addresses the issues of computational complexity via an extended range of simplifying decompositions of the full joint probability distribution made available with a Bayesian network representation.

It is also an object of the invention to provide an expert/diagnostic system which fully implements a Bayesian network and which automatically updates the probability matrices of the network on the basis of experiential knowledge.

It is another object of the invention to provide methods for rapidly defining probability matrices for Bayesian network nodes based on incomplete knowledge from an expert.

It is another object of the invention to provide methods for structuring the display of raw data to system operators in order to increase the quantity of data that can be effectively monitored by an operator.

It is still another object of the invention to provide methods for reducing the amount of data needed to automatically update the probability matrices of the network on the basis of experiential knowledge.

It is a further object of the invention to provide a practical exemplary embodiment of an expert/diagnostic system which incorporates the features of the invention.

In accord with these objects which will be discussed in detail below, the methods of the present invention include defining an expert system as a Bayesian network and assigning probability matrices to the nodes in the network, gathering new information about conditional and marginal probabilities from problems solved, and updating the probability matrices with the new information. The invention provides a new method for quickly and easily quantifying the conditional probability matrices in a Bayesian network and for reducing the amount of data needed to be stored in order to automatically update the probability matrices of the network on the basis of experiential knowledge. According to a presently preferred embodiment, the invention also provides methods for automatically collecting knowledge from experience and automatically updating the Bayesian network with the collected knowledge. The presently preferred embodiment also includes methods for structuring the display of evidence data on a computer monitor so that it can be more easily filtered and accessed at the discretion of system operators.

A practical exemplary embodiment of the invention, which is the titled subject of the provisional application attached hereto as Appendix A, provides a trouble ticket fault management system for a communications network. The exemplary embodiment is particularly appropriate for utilizing the automatic learning capabilities of the invention because (1) the domain of application (communications networks fault management) requires constant updating of the underlying model and cannot be represented well with a static knowledge base; and (2) it makes use of a trouble ticketing system which is similar to trouble ticketing systems normally used in the maintenance of a communications network.

In the exemplary embodiment, a communications network is represented as a Bayesian network where devices, communication links, and the problems and symptoms associated with these are represented as nodes in the Bayesian network. The nodes are assigned conditional probability matrices according to the methods of the invention. Data from the network is collected using readily available communications network management tools (e.g. PING, SNMP, packet sniffing, or other proprietary network testing tools that are included with vendors' devices). At regular intervals a vector of data values is collected from the network and input to the system as a "problem description". A "problem description" may consist of a set of data values taken off the network that are indicative of an improperly functioning network. When a problem description is input to the system, the probabilistic inference algorithms are run and the system generates probabilities for the potential causes of the problem, including the conclusion that no fault is present. Each time the inference engine is run, system conclusions are formatted for display on a computer monitor and a graphical user interface (GUI) component updates the data display. The GUI also responds to operator requests for additional information about data used to generate particular problem hypotheses.

According to the presently preferred embodiment, when a problem in the communications network is suspected by a human operator, it is recorded in the form of a trouble ticket. A problem may be suspected either as a result of conclusions generated by the Bayesian network inference engine or by other information available outside the scope of this system. The trouble ticket records the status of the particular problem over the course of a troubleshooting and repair session that may last for a few minutes to a number of days or weeks. Human operators are expected to update the information in the trouble ticket as actions are taken to resolve the problem and additional information about the problem accumulates. When a network manager opens a trouble ticket as a result of information generated by the Bayesian network inference engine, e.g. by clicking a mouse button on a line in the data display, many fields in the ticket may be automatically completed with raw data collected from the network or information available in the Bayesian network knowledge base. When a suspected problem associated with a particular trouble ticket is either repaired or otherwise resolved, the trouble ticket is closed and a permanent record of the problem and its course of development, including the known cause of the problem, is recorded in a data base.

Information about initial problem symptoms and the finally resolved cause of (and/or solution to) the problem is used to automatically update the model of the domain stored in the Bayesian network knowledge base. When a problem has been resolved and the trouble ticket is closed, the model learning component of the system is invoked to automatically update the appropriate probability matrices in the Bayesian network. This enables the system to adapt its model of the domain either to improve an initial model in an unchanging domain or to learn a new model as conditions in the communications network change.

According to a presently preferred embodiment, the trouble ticket fault management system includes a graphical user interface which allows the network manager to select levels of information about the network to avoid "information overload". The interface displays a "problem tail" which contains high level information which is easy to assimilate. The information presented in the "problem tail" includes the system's conclusions about the cause or causes of potential problems in the network. The problem tail display is automatically updated each time the system completes its inference cycle using a new vector of data collected from the network. In one embodiment tested using data from the NSFNET backbone, simulated data was collected, inference algorithms were run, and the problem tail display was updated every fifteen seconds. Since the problem tail display shows only system conclusions, the interface also allows a network operator to display underlying raw data collected from the network tests organized according to its use in the probabilistic analysis supporting a suggested solution to the fault.

Additional objects and advantages of the invention will become apparent to those skilled in the art upon reference to the detailed description taken in conjunction with the provided figures.

DESCRIPTION OF THE APPENDICES

Figures 1, 1A:
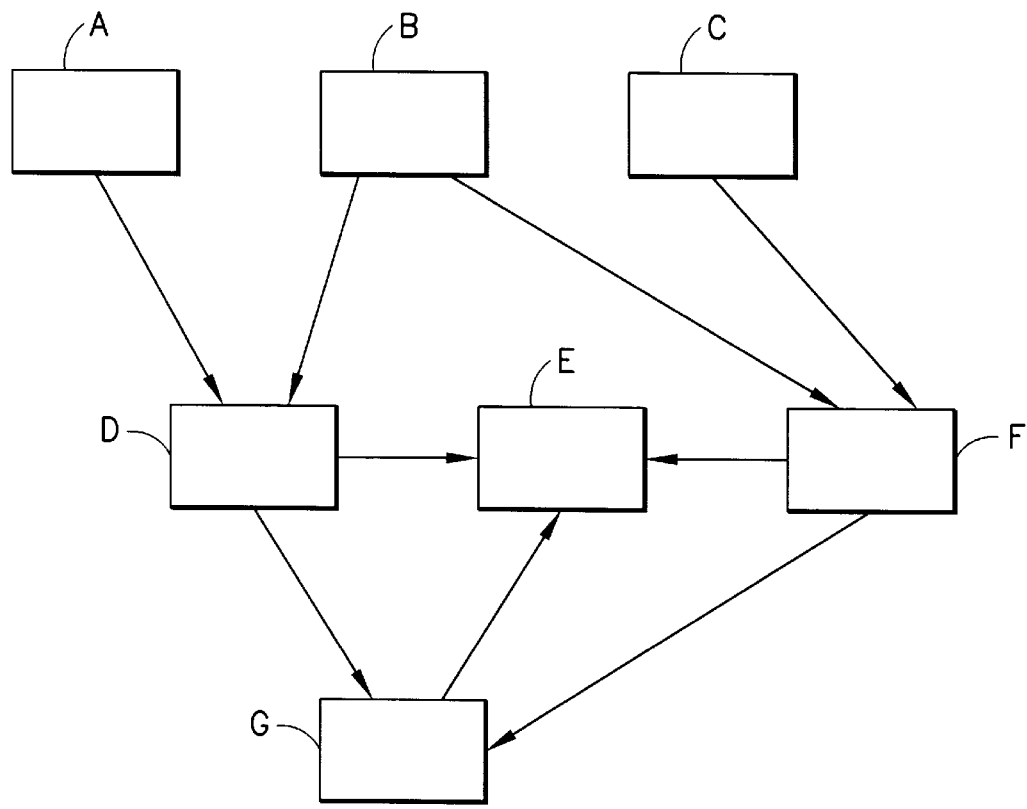
FIG. 1 is a diagram of a Bayesian network according to the prior art.
FIG. 1a is a diagram of a probability matrix according to the prior art.

Appendix A is a copy of provisional application Ser. No. 60/002,591.

DETAILED DESCRIPTION OF THE PREFERRED EMBODIMENTS

The diagnostic/expert system according to the invention utilizes a Bayesian network model which is created using conventional tools such as the HUGIN software package described above. In accord with one aspect of the invention, link weights are quantified and organized in a matrix for each node in the network.

The invention provides a Model Update Component which is described below with reference to FIGS. 2 and 3. Generally speaking, the Model Update Component maintains a set of data structures which mirrors the conditional probability matrices in the Bayesian Network Model of the domain. However, whereas the cells in the Bayesian Network Model contain probabilities, the cells of the matrices in the Model Update Component contain integers that represent the number of times the particular configuration represented by the cell has been observed. In the code listing "update.c" in Appendix A, this is the set of matrices faults[i].descp, and evidence[i].descp where i ranges over the set of nodes in the Bayesian network model.

When the system is started for the first time all matrix cells in both the Bayesian Network Model and the Model Update Component are set to initial values. The values and the method of updating these values are determined according to a model update policy. According to the invention, the model update policy preferably satisfies the following conditions: (1) a new probability distribution can be obtained without reference to information beyond the total number of observations of all cases, the description of the latest observation, and the previous probability value for cells that match the latest observation, (2) any new probability values are consistent according to the laws of probability with all other probability values already specified, and (3) only probability values in root cells and cells with a parent configuration that matches the new observation need to be modified.

While those skilled in the art will appreciate that many model update policies may satisfy these conditions, two alternative model update policies are provided herein. It will also be appreciated that the Model Update Component may be provided with more than one update policy, provided that the Model Update Component provides means for the user to select among the update policies at the time the system is started up for the first time.

According to the invention, each time an instance is observed, the contents of those cells that represent configurations that match the observed instance are modified. When a matrix includes a cell whose configuration matches an instance, the cells in the Bayesian Network Model that represent mutually exclusive alternative values for that matrix's node/variable are also modified. An instance "matches" a cell configuration in one of the matrices in the Model Update Component or the Bayesian Network Model when all of the values associated with the cell match a corresponding variable value in the observed instance. Because an observed instance may include values for variables outside the scope of a particular matrix, a cell configuration may match only a subset of the values in the instance and cell configurations in many matrices may match a single observed instance. However, because each cell in a matrix represents a mutually exclusive alternative, at most one cell configuration in each matrix will match a given observed instance.

For example, Appendix A page 167 shows diagrams of two embodiments of a model update policy that can be used to update the probabilities in a discrete Bayesian Network Model. In this diagram the contingency table on the left shows the conditional probability matrix included at node "Houston/Atlanta Link" in the Bayesian Network Model. The contingency table on the right shows the mirror data structure that is maintained in the Model Update Component. In both embodiments, each time a set of variable values is sampled from the domain, cells with matching configurations in the Model Update Component are incremented by one. In the embodiment described on the left hand side of the diagram, the link weights, i.e. the contents of the cells of the matrices in the Bayesian network model are determined using the relative frequency of observed data instances. In this embodiment, the Model Update Component initializes all cells in the matrices of the Bayesian Network model to zero when the system is started up for the first time. Following this, each time a matrix of variable values is sampled from the domain, cells with matching configurations in the Model Update Component are incremented by one. Given an observed instance that includes the variable values, $X=x_i, U_k=u_k \ldots U_j=u_j$ the Model Update Component will increment the cell with matching configuration, $n(X=x_i, U_k=u, \ldots U_j=u)=n(X=x_i, U_k=u, \ldots U_j=u)+1$. The Model Update Component then modifies cells in the Bayesian Network Model according to the algorithm below:

for each p such that $U_k=u, \ldots U_j=u$ $$p(X=x_i, U_k=u, \ldots U_j=u)=n(X=x_i, U_k=u, \ldots U_j=u)/\Sigma_{x_i} n(X=x_i, U_k=u, \ldots U_j=u)$$

where $p(X=x_i, U_k=u, \ldots U_j=u)$ is a probability in the Bayesian Network Model and $n(X=x_i, U_k=u, \ldots U_j=u)$ is the associated cell in the Model Update Component which keeps track of the number of data points observed with that configuration.

While "Relative Frequency" is a useful model update policy which is easy to implement, the initial probabilities must all be set to zero which is paradoxical. Knowledge is acquired slowly as instances are observed. Moreover, probability values computed using this method are very unstable and may fluctuate widely with each new instance until a large number of instances have been observed.

A better Model Update Policy is provided according to the invention using Bayesian inference over all discrete probability distributions. In this presently preferred embodiment, the Model Update Component maintains the matrices of instance configuration counts as described above. However, it updates cells in the Bayesian Network Model as described below.

For non-root nodes, conditional probabilities (cells of the matrix) are quantified according to equation (4).

$$P(X = x \mid U_1 = u_1, \ldots, U_n = u_n) = \frac{r/dom(X, U_1, \ldots, U_n) + NUM(X = x, U_1 = u_1, \ldots, U_n = u_n)}{r/dom(U_1, \ldots, U_n) + NUM(U_1 = u_1, \ldots, U_n = u_n)} \quad (4)$$

The terms "$U_1, \ldots, U_n$" represent the parents of node "X", the terms "$u_1, \ldots, u_n$" represent the respective values of the parent variables, and the term "x" is the value of the node "X" variable. The term r is the total number of configurations, i.e. the cardinality of the complete domain. The term "dom(X, $U_1, \ldots U_n$)" is the cardinality of the matrix at node "X", i.e. the combinations of the values of the variables at the parents of node "X" and the variable at node "X". The term "NUM(X=x,$U_1$=$u_1$, . . . ,$U_n$=$u_n$)" is the number of times the variable at node X has shown the value x given the set of parent variable values $U_1$=$u_1$, . . . ,$U_n$=$u_n$. The term "dom($U_1, \ldots U_n$)" is the cardinality of the domain of parents. The term "NUM($U_1$=$u_1$, . . . ,$U_n$=$u_n$)" is the number of times the variables at the parents have shown the stated values.

For a root, the marginal probability is quantified according to equation (5).

$$P(X = x) = \frac{1}{m+r} \times \left( \frac{r}{dom(x)} + NUM(X = x) \right) \quad (5)$$

The term "m" represents the sample size, i.e. the number of observations received so far. The term "dom(x)" is the cardinality of the variable values and the term "NUM(X=x)" is the number of times the variable X has shown the value x.

Equations (4) and (5) may be used to set the initial probability values for every cell of every matrix in the network and may also be used to update the matrices with new probability information as described below. According to the invention, the network may be initialized with no knowledge by setting the "NUM . . . " terms to zero in which case probabilities are equally distributed throughout the network. Alternatively, the network may be initialized with specifically chosen probabilities by selecting appropriate "NUM . . . " terms to generate the desired "P(X=x . . . )" values. From the above, those skilled in the art will appreciate that choosing high value NUM terms will result in slow convergence during the learning process and choosing low value NUM terms will result in rapid incorporation of learned probabilities.

According to another aspect of the invention, the marginal and conditional probabilities are updated regularly with newly observed information. The marginal or conditional probabilities for each node X are stored in a matrix called PROB which has as many rows as possible states of X and as many columns as the cardinality of the domain of X (i.e. the product of the number of states of all the parents of X). In order to apply equations (4) and (5) for updating the PROB matrices, an additional matrix called DESCP must be stored for each node X. The DESCP matrix stores descriptions of the states of X and its parents (referred to as the NUM terms in equations (4) and (5)). It will be appreciated that the DESCP matrix will be the same size as the PROB matrix.

According to still another aspect of the invention, it has been discovered that the DESCP matrix need not be as large as the PROB matrix. For non-root nodes, it is not necessary to keep track of both terms "NUM(X=x,$U_1$=$u_1$, . . . ,$U_n$=$u_n$)" and "NUM($U_1$=$u_1$, . . . ,$U_n$=$u_n$)". It is possible to derive the second term from the first term by summing the first term over all possible values of X. This results in substantial savings in storage space. Each conditional probability can be updated by using only the previous value of the conditional probability and the previous value of NUM. For the cell in the matrix which matches the observed state of X and the observed states of the parents of X, the probability that X will show this state and the parents A will show states a is calculated according to equation (6) where C(X)=r/dom(X).

$$P(X = x, A = a) = \frac{C(X, A) + PrevNUM(x, a) + 1}{C(X, A) + PrevNUM(x, a) + PrevP(x, a)} \times PrevP(x, a) \quad (6)$$

For the cell(s) in the matrix which do not match the observed state of X, but do match the parent(s) of X, the probability that X will show these state(s) and the parents A will show state(s) a is calculated according to equation (7).

$$P(X = x, A = a) = \frac{1}{\frac{1}{PrevP(x, a)} + \frac{1}{C(X, A) + PrevNUM(x, a)}} \quad (7)$$

The proof that equations (6) and (7) accomplish the same result as equation (4) is set out in the attached Appendix A.

Equations (6) and (7) are implemented by software in order to automatically update the Bayesian network model. An example of software implementing equations (6) and (7) is included in Appendix A as "update.c" and "demo.c".

Figure 2:
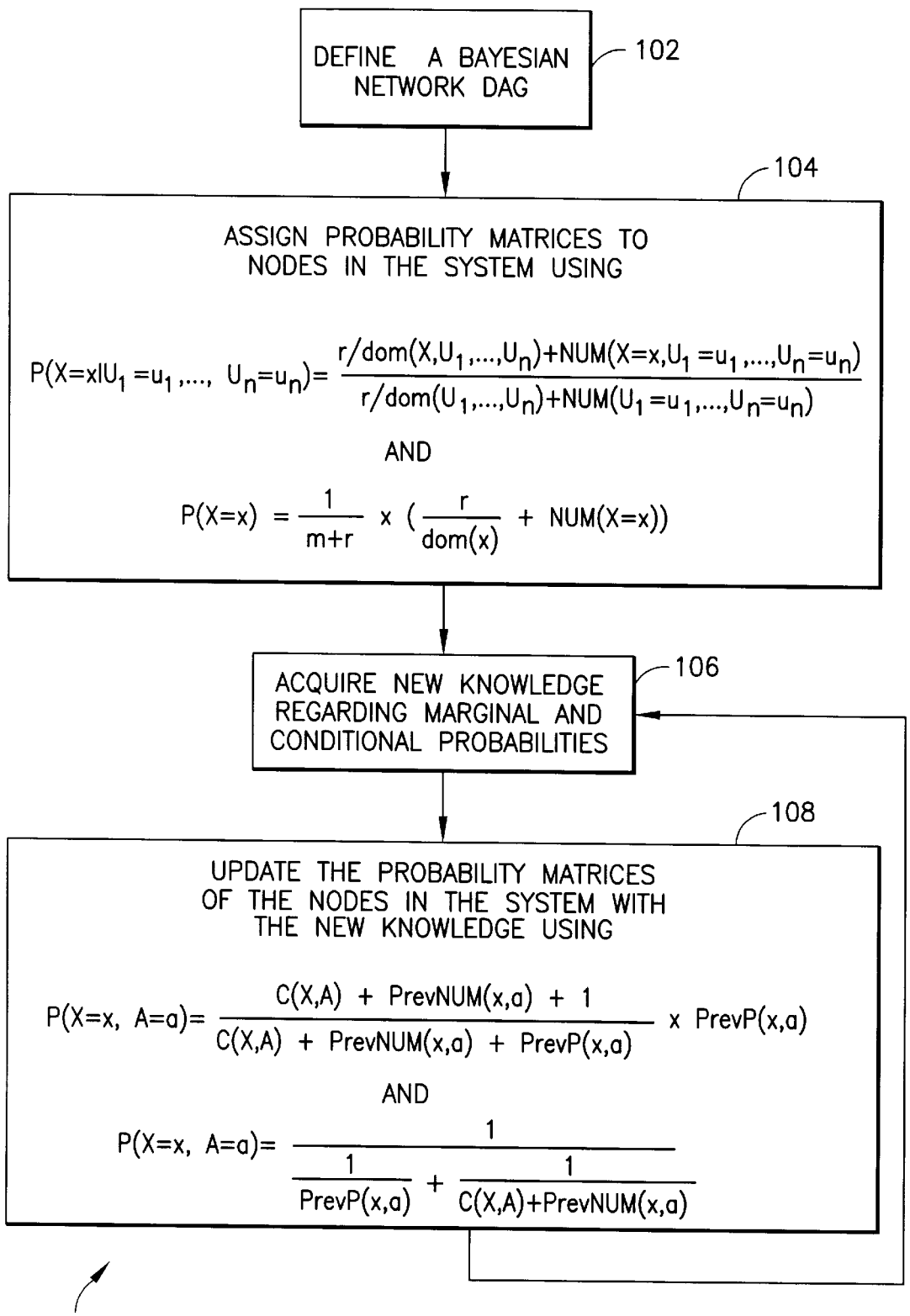
FIG. 2 is a block diagram of a method of automatically updating probability matrices in a Bayesian network according to the invention.

Turning now to FIG. 2, it will be appreciated that the Bayesian network learning method 100 of the invention may be illustrated as four steps, two of which are repeated indefinitely in order to enhance the accuracy of the expert system. First, a Bayesian network DAG is defined as shown by numeral 102. This step encompasses the identification of nodes in the network and the drawing of links between nodes. Second, probability matrices are assigned to the nodes in the network, preferably using the equations (4) and (5) as shown at numeral 104 in FIG. 2. However, as described above, the matrix definitions may be provided using other known methods. Next, new knowledge is acquired regarding the conditional and marginal probabilities as indicated by numeral 106 in FIG. 2. The acquisition of new knowledge may be performed manually, automatically, or a combination of manual and automatic acquisition as described in more detail below. The new knowledge is then used to update the probabilities using equations (6) and (7) as shown by numeral 108 in FIG. 2. The acquisition of new knowledge and the updating of probabilities may be repeated indefinitely as indicated by the looping arrow connecting steps 108 and 106 in FIG. 2.

As mentioned above, a practical exemplary embodiment of the invention, which is the titled subject of the provisional application attached hereto as Appendix A, provides a trouble ticket fault management system for a communications network. The exemplary embodiment is particularly appropriate for utilizing the automatic learning capabilities of the invention.

Figure 3:
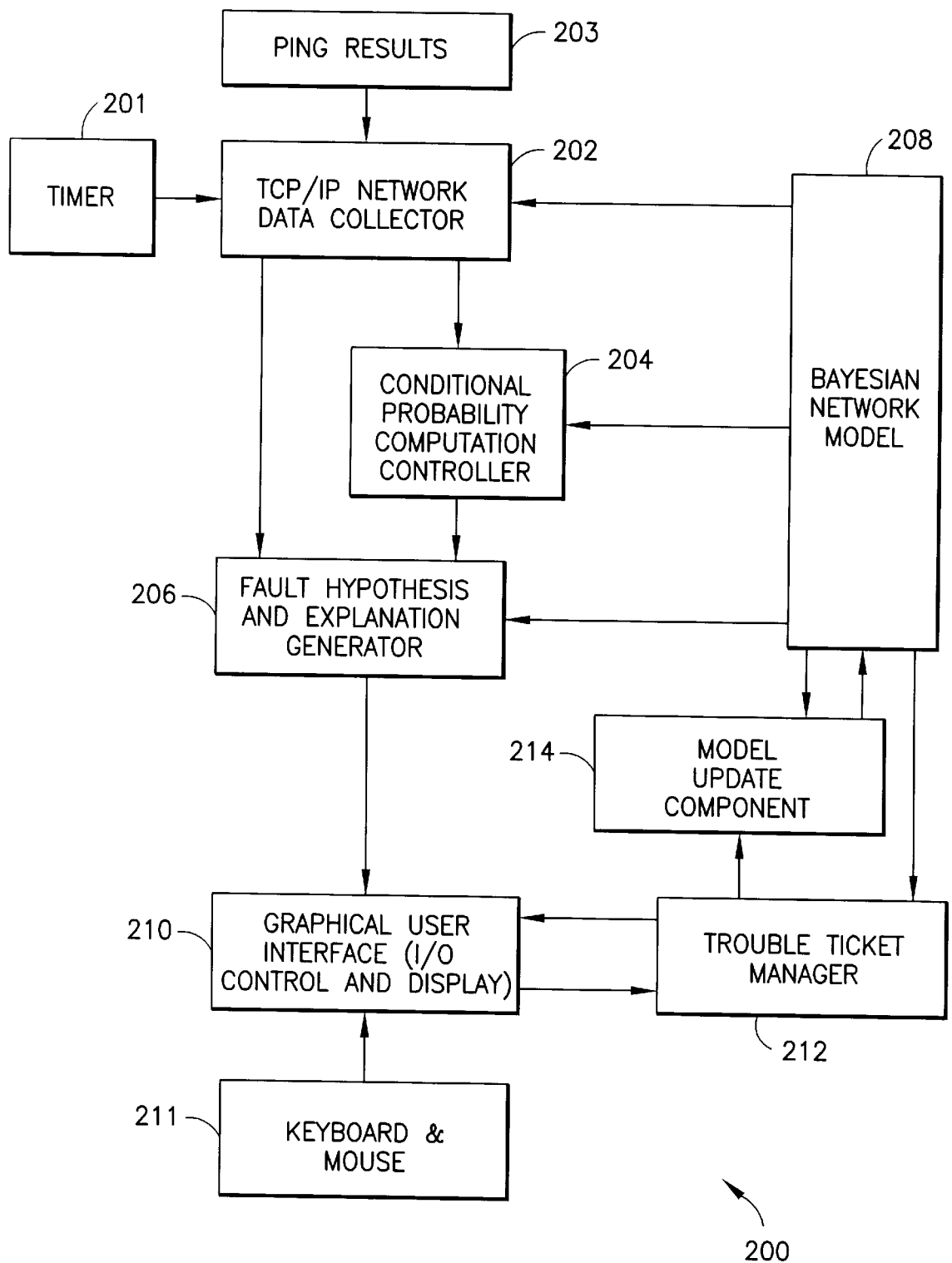
FIG. 3 is a block diagram of a trouble ticket fault management system utilizing the methods of the invention.

Referring now to FIG. 3, according to the exemplary embodiment, the trouble ticket fault management system 200 includes a TCP/IP data collector 202, a conditional probability computation controller 204, a fault hypothesis and explanation generator 206, a Bayesian network model 208, a graphical user interface 210, a trouble ticket manager 212, and a model update component 214.

The TCP/IP data collector iteratively executes diagnostic utilities to retrieve status data from network devices, the results of which 203 are stored for analysis. The Bayesian network model 208 is a Bayesian network where devices, communication links, and problems and symptoms associated with these are represented as nodes in the Bayesian network. An example of the layout of the Bayesian network is included in the attached Appendix A. The nodes are assigned conditional probability matrices according to the methods of the invention described above. The stored results of the diagnostic utilities are instantiated in the Bayesian network 208 using the conditional probability computation controller 204. The distributed probabilities are analyzed by the fault hypothesis and explanation generator 206 and a high level listing of network faults is displayed by the graphical interface 210 in a window referred to as the "problem tail". The network administrator may select a piece of information in the problem tail (using a keyboard or mouse 211) to view the underlying support for the fault diagnosis.

The graphical interface 210 also allows the network administrator to open a "trouble ticket" via the trouble ticket manager 212 which is used to collect information about the fault and its solution. Information from the TCP/IP data collector 202 is automatically entered in the trouble ticket and the network administrator completes the trouble ticket with additional information regarding the steps taken to solve the problem. When the fault is corrected, i.e. when the problem is solved, the network administrator uses the graphical interface 210 to close the trouble ticket and the completed trouble ticket is stored by the trouble ticket manager 212. The graphical interface 210 also allows the network administrator to automatically update the Bayesian network model 208 with the new knowledge from completed trouble tickets. The interface directs the trouble ticket manager 212 to pass information to the model update component 214 which then redefines the appropriate probability distributions in the Bayesian network model 208 using equations (6) and (7) described above.

The trouble ticket fault management system preferably performs communication network testing according to a repeating timed schedule so that the problem tail is automatically generated. Accordingly, the TCP/IP network data collector is driven by a timer 201 as shown in FIG. 3.

From the foregoing, and the attached Appendix A, it will be appreciated that the Bayesian network model 208 and the conditional probability computation controller 204 may be implemented using the HUGIN software. The model update component 214 may be implemented using the "update.c" code from Appendix A. The fault hypothesis and explanation generator 206 may be implemented using the netdemo.c code contained in Appendix A. The data collector 202, trouble ticket manager 212, and the GUI 210 may be implemented using the techniques described in the "Trouble Ticket Database Management System" and "Trouble Ticket System's GUI" documents contained in Appendix A.

There have been described and illustrated herein diagnostic systems utilizing a bayesian network model having link weights updated experientially. While particular embodiments of the invention have been described, it is not intended that the invention be limited thereto, as it is intended that the invention be as broad in scope as the art will allow and that the specification be read likewise. Thus, while particular applications for the system have been disclosed, it will be appreciated that the disclosed expert system could be utilized for many different applications. Also, while particular methods for collecting experiential data have been shown, it will be recognized that other types of data collection methods could be used with similar results obtained. Moreover, while particular configurations have been disclosed in reference to a graphical interface for the trouble ticket manager, it will be appreciated that other configurations could be used as well. It will therefore be appreciated by those skilled in the art that yet other modifications could be made to the provided invention without deviating from its spirit and scope as so claimed.

What is claimed is:

1. An apparatus for detecting problems in a system which generates a plurality of symptoms, said apparatus comprising:
    a) a storage device storing a Bayesian network model representing a domain of knowledge about the system wherein each node of said model represents one of the state of the system, the state of a component of the system, and a symptom, and each node is associated with a conditional probability matrix which specifies the relationship of the node to one of probabilistic dependents and probabilistic antecedents in the model;
    b) monitoring means for monitoring a plurality of symptom data values;
    c) means for instantiating symptom data values in said Bayesian network model;
    d) means for automatically updating appropriate probability matrices on the basis of new knowledge obtained by said monitoring means about the probable association of symptoms with problems and thereby changing said Bayesian network model to better represent said domain of knowledge as new knowledge accumulates; and
    e) means for using said updated Bayesian network model to detect problems in the system.

2. An apparatus according to claim 1, further comprising:
    e) means for gathering new knowledge about the probable association of symptoms with problems.

3. An apparatus according to claim 2, wherein:
    said means for gathering includes a plurality of iteratively executed diagnostic tests.

4. An apparatus according to claim 2, wherein:
    said means for gathering includes a user input device.

5. An apparatus according to claim 1, wherein:
    said means for automatically updating includes means for reducing the amount of data needed to automatically update said probability matrices.

6. An apparatus according to claim 1, further comprising:
    e) graphical display means for displaying problems and diagnoses, wherein said display means provides high level information with the ability to choose display of underlying data.

7. An apparatus according to claim 1, wherein:
    said means for automatically updating includes means for incrementally updating probability values in the cells of the probability matrices such that a new probability distribution is obtained without reference to information beyond the total number of observations of all cases, the description of the latest observation, and the previous probability value for cells that match the latest observation.

8. An apparatus according to claim 1, wherein:
    said means for automatically updating includes means for incrementally updating probability values in the cells of the probability matrices such that any new probability values are consistent according to the laws of probability with all other probability values already specified, and only probability values in root cells and cells with a parent configuration that matches the new observation need to be modified.

9. An apparatus according to claim 1, wherein:
    said means for updating the cell in the matrix which matches the observed state of X and the observed states of the parents of X, includes means for calculating the probability that X will show this state and the parents A will show states according to equation $$P(X = x, A = a) = \frac{C(X, A) + PrevNUM(x, a) + 1}{C(X, A) + PrevNUM(x, a) + PrevP(x, a)} \times PrevP(x, a)$$

where C(X)=r/dom(X), and said means for updating the cell(s) in the matrix which do not match the observed state of X, but do match the parent(s) of X, includes means for calculating the probability that X will show these state(s) and the parents A will show state(s) a according to the equation $$P(X = x, A = a) = \frac{1}{\frac{1}{PrevP(x, a)} + \frac{1}{C(X, A) + PrevNUM(x, a)}}.$$

10. A method of implementing an expert diagnostic system which diagnoses problems given symptoms, comprising:
   a) representing problems and symptoms as nodes in a Bayesian network model representing a domain of knowledge;
   b) linking problems with associated symptoms with causality vectors;
   c) defining a conditional probability matrix for each symptom being caused by a set of problems;
   d) monitoring a plurality of symptom data values;
   e) instantiating symptom data values in the Bayesian network model;
   f) automatically redefining appropriate conditional probability matrices based on new knowledge about the probable association between symptoms and problems obtained from said step of monitoring and thereby changing the Bayesian network model to better represent the domain of knowledge as new knowledge accumulates; and
   g) making a diagnosis using the updated Bayesian network model.

11. A method according to claim 10, further comprising:
   e) collecting new knowledge regarding the probable association between symptoms and problems.

12. A method according to claim 11, wherein:
said step of collecting includes iteratively executing a plurality of diagnostic tests.

13. A method according to claim 11, wherein:
said step of collecting includes manually inputting data.

14. A method according to claim 10, wherein:
said step of automatically updating includes reducing the amount of data needed to automatically update the probability matrices.

15. A method according to claim 10, further comprising:
   e) graphically displaying problems and diagnoses, wherein said display provides high level information with the ability to choose display of underlying data.

16. A method according to claim 10, wherein:
said step of automatically updating includes incrementally updating probability values in the cells of the probability matrices such that a new probability distribution is obtained without reference to information beyond the total number of observations of all cases, the description of the latest observation, and the previous probability value for cells that match the latest observation.

17. A method according to claim 10, wherein:
said step of automatically updating includes incrementally updating probability values in the cells of the probability matrices such that any new probability values are consistent according to the laws of probability with all other probability values already specified, and only probability values in root cells and cells with a parent configuration that matches the new observation need to be modified.

18. A method according to claim 10, wherein:
said step of updating the cell in the matrix which matches the observed state of X and the observed states of the parents of X, includes calculating the probability that X will show this state and the parents A will show states according to equation $$P(X = x, A = a) = \frac{C(X, A) + PrevNUM(x, a) + 1}{C(X, A) + PrevNUM(x, a) + PrevP(x, a)} \times PrevP(x, a)$$

where C(X)=r/dom(X), and said step of updating the cell(s) in the matrix which do not match the observed state of X, but do match the parent(s) of X, includes calculating the probability that X will show these state(s) and the parents A will show state(s) a according to the equation $$P(X = x, A = a) = \frac{1}{\frac{1}{PrevP(x, a)} + \frac{1}{C(X, A) + PrevNUM(x, a)}}.$$

19. A trouble ticket fault management system for a communications network, comprising:
   a) storage device for storing a Bayesian network model representing a domain of knowledge about the communications network wherein each node of said model is associated with one of a device, a link, a device problem, a link problem, a device symptom, and a link symptom, and each node is associated with a probability matrix associating symptom data values with one or more problems;
   b) monitoring means for monitoring a plurality of symptom data values;
   c) means for instantiating symptom data values in said Bayesian network model;
   d) means for gathering new knowledge about the probable association of symptoms with problems;
   e) means for automatically updating appropriate probability matrices on the basis of new knowledge obtained by said means for gathering about the probable association of symptoms with problems and thereby changing said Bayesian network model to better represent said domain of knowledge as new knowledge accumulates; and
   f) means for detecting faults within the communications network using said updated Bayesian network model.

20. A system according to claim 19, wherein:
said means gathering includes a trouble ticket manager coupled to a user interface for inputting information about symptoms and problems which have been resolved.

* * * * *